United States Patent
Sheridan (10) Patent No.: US 12,450,813 B1
(45) Date of Patent: Oct. 21, 2025

(54) METHODS FOR LIMITED-ANGLE SPARSE COMPUTED TOMOGRAPHY RECONSTRUCTION

(71) Applicant: Government of the United States, as represented by the Secretary of the Air Force, Wright-Patterson AFB, OH (US)

(72) Inventor: Luke Sheridan, Cedarville, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 311 days.

(21) Appl. No.: 18/224,813

(22) Filed: Jul. 21, 2023

Related U.S. Application Data (60) Provisional application No. 63/400,699, filed on Aug. 24, 2022.

(51) Int. Cl.
*G06T 15/00* (2011.01)
*G06T 7/60* (2017.01)

(52) U.S. Cl.
CPC .............. *G06T 15/00* (2013.01); *G06T 7/60* (2013.01); *G06T 2207/10081* (2013.01);
(Continued)

(58) Field of Classification Search
CPC ........... A61B 6/032; A61B 5/00; A61B 5/055; A61B 6/025; A61B 6/037; A61B 6/4014; A61B 6/4071; A61B 6/4085; A61B 6/4458; A61B 6/482; A61B 6/488; A61B 6/5205; G06T 11/006; G06T 2211/424; G06T 2207/30004; G06T 2211/421; G06T 11/008; G06T 11/005; G06T 2200/04; G06T 2207/10088; G06T 2207/10112; G06T 2207/10116; G06T 2207/20081;
(Continued)

(56) References Cited

U.S. PATENT DOCUMENTS

| | | |
|---|---|---|
| 4,680,709 A | 7/1987 | Srinivasan et al. |
| 8,804,901 B2 | 8/2014 | Maurer, Jr. et al. |

(Continued)

*Primary Examiner* — Manuchehr Rahmjoo
(74) *Attorney, Agent, or Firm* — AFMCLO/JAZ; Jeffrey V. Bamber (57) ABSTRACT

A method for limited-angle sparse computed tomography (CT) reconstruction and is disclosed. The method involves: a) obtaining a sinogram image of an object from a limited number of scan angles; b) constructing sine waves represented in the sinogram image; c) superimposing the sine waves over the sinogram image; and d) creating a Hough Space representation to identify sinusoidal features in the sinogram image. A method for next scan angle prediction to identify and characterize stochastic, internal geometric features of an object is also provided. This method includes: a) identifying intersection angles for pairs of superimposed sine-like features, b) counting the number of intersections at each angle, c) calculating the distance of every unscanned angle from the nearest scanned angle, d) and calculating a score for each unscanned angle. The angle with the highest score is a candidate for the next scan angle. Error metrics for this method are also discussed.

5 Claims, 10 Drawing Sheets
(6 of 10 Drawing Sheet(s) Filed in Color)

(52) U.S. Cl.
CPC ............... *G06T 2207/30004* (2013.01); *G06T 2210/21* (2013.01); *G06T 2210/41* (2013.01)

(58) Field of Classification Search
CPC . G06T 2207/20084; G06T 2207/20224; G06T 2210/41; G06T 2211/428; G06T 2211/436; G06T 2211/441; G06T 2211/444; G06T 3/4007; G06T 5/50; G06T 5/70; G06T 7/0014; G06T 7/11; G06T 7/20; G06T 7/70; G06N 3/045; G06N 3/084; G06N 20/00; G06N 3/047; G06N 3/08; A61N 2005/1061; A61N 5/1049; A61N 5/1067; A61N 5/1083; G06V 10/245
See application file for complete search history.

(56) References Cited

U.S. PATENT DOCUMENTS

| | | | |
|---|---|---|---|
| 9,508,163 B2 * | 11/2016 | Yu | ............... G06T 11/006 |
| 10,970,887 B2 | 4/2021 | Wang et al. | |
| 11,195,310 B2 | 12/2021 | Fu et al. | |
| 11,308,664 B2 | 4/2022 | Manhart et al. | |
| 2011/0002532 A1 | 1/2011 | Frakes et al. | |

\* cited by examiner

METHODS FOR LIMITED-ANGLE SPARSE COMPUTED TOMOGRAPHY RECONSTRUCTION

Pursuant to 37 C.F.R. § 1.78(a)(4), this application claims the benefit of and priority to prior filed Provisional Application Ser. No. 63/400,699, filed Aug. 24, 2022, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to computed tomography (CT) imaging and, more particularly, to methods for limited-angle sparse computed tomography reconstruction.

BACKGROUND OF THE INVENTION

Computed tomography (CT) is an imaging technique that leverages x-rays passing through a solid medium to excite detector elements opposite the x-ray source and portray a projected view of the subject. A series of projections taken at different angles can then be reconstructed to portray a 3-dimensional representation which gives insight into location, shape, and size of internal objects and/or features. This technique is common practice in the medical fields for organ and bone imaging, and is used to provide visual insight into organ well-being and/or anomalous behavior within the body. In industrial applications, CT is often used as a non-destructive inspection (NDI) technique to confirm internal geometry, identify anomalous regions, and provide insight to material density without destructive cutting, sectioning, or disassembly. In both industrial and medical cases, CT as an alternative to invasive and/or destructive inspection and imaging is a valuable approach; however, CT also has several draw backs. In medical applications, excessive x-ray exposure and long-scan time has been mitigated through the use of sparse CT techniques which reduce the number of x-ray projections from thousands to hundreds of projections. In industrial applications where x-ray dosing is not as large of an issue and high quality, high resolution images are desirable for increased insight into smaller features, cost is often a driver for new methods of collecting and interpreting CT data. Reductions in time, exposure, and overall cost, often result in lower quality images with large image artifacts and or distortions in the reconstruction which inhibit readability and interpretability.

CT reconstruction often falls in several main categories including back-projection (U.S. Pat. No. 4,680,709), interpolation (U.S. Patent application publication US 2011/0002532 A1), iterative reconstruction (U.S. Pat. No. 9,508,163 B2; U.S. Pat. No. 11,195,310), and even deep learning reconstructions (U.S. Pat. No. 10,970,887). In many of these approaches, projections are generated homogeneously and equally spaced around the entirety of the subject. In many applications, the sinogram image represents sparse projected data nicely and provides a visual means to identify regions where more data is required and the approximate location and intensity of features at different rotational perspectives of the subject. It is the missing information not contained within the sinogram that must be filled in to perform a successful reconstruction. Several patents have been directed to filling in this data using the methods described above. U.S. Pat. No. 11,308,664 B2, describes a method to reconstruct a 3D volume based on 2D images across a limited angle using a machine learning-based artifact reduction technique. U.S. Pat. No. 11,308,664 B2 addresses an approach to reconstruction in limited angle cases, but does not provide insight into methods for identifying next scan angle.

Additionally, in many implementations of sparse tomographic techniques, the projection measurements are assessed in an unconstrained 180 or 360 degree span. Most sparse applications tend to use evenly distributed scans around the circumference of the scan subject. For many industrial applications, complex exterior structure shape, size, orientation, overlap, etc. may inhibit full 360 degree scanning paths. Furthermore, evaluation of regions of interest (ROI) often requires scanning the entire part and probing a subset of the collected data which results in wasted time, cost, and energy.

A need, therefore, exists for image reconstruction with sparse, limited angle data, that while not achieving perfect reconstruction, will enable a cost-effective mechanism for performing a preliminary assessment of internal features within a solid subject for both medical and industrial applications where targeted, partially obstructed features are present. A need also exists for a method for identifying the next projection angle that will maximize the insight gained for each successive projection. A need further exists for targeted approaches to minimize scan time and maximize scan angle data efficiency to identify and target scan angles that maximize information obtained in a single scan.

SUMMARY OF THE INVENTION

The present invention relates generally to computed tomography (CT) imaging and, more particularly, to methods for limited-angle sparse computed tomography reconstruction.

While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a method for reconstructing a three-dimensional result image data set from a plurality of two-dimensional tomographic images that create a three-dimensional representation of an object and its corresponding internal features is disclosed. The method comprises the steps of:
  a) obtaining a sinogram image of the object from a limited number n of scan angles from a rotation around the object wherein X-rays were projected on the object and travel through the object to sensors at various locations, and the sinogram image (or simply "sinogram") portrays sinusoidal paths that represent the radial locations and observed widths of features in the object throughout the rotation, the sinusoidal paths having an amplitude and a phase shift;
  b) constructing a plurality of sine waves that represent sine wave amplitude and phase shift combinations at a spatial frequency represented in the sinogram image, wherein the sine waves intersect sinographic pixel locations, the sinographic pixels having a pixel intensity value corresponding to the observed transmissibility of the object at the sensor location;

c) superimposing the plurality of sine waves over the sinogram image; and d) calculating the sum of all intersecting pixel intensity values for each sine wave, and assigning the summation to a matrix position in order to create a Hough Space representation in which combinations of amplitude and phase shift resemble sine waves within the sinogram image, and each Hough peak maximum corresponds to the characteristic waveform of the sinusoidal paths in the sinogram image.

A method for identifying and targeting scan projection angles of an object in a computed tomography process to maximize information that can be obtained in one or more future scans is also provided. The method may comprise the steps or further steps of:

a) obtaining a sinogram image and a Hough Space representation of an object, wherein the Hough Space representation represents a plurality of sine wave-like (or "sine-like") figures within the sinogram, and portrays them as peaks at locations corresponding to the centroidal radial location and rotational phase shift of the discrete feature;

b) identifying the centroids of each discrete feature in the sinogram, the features each having a centroidal sine wave;

c) comparing the centroidal sine wave of each feature to each of the other sine-like figures in the sinogram image, and identifying the angles of intersection;

d) counting the total number of intersections at each projection angle represented by the sinogram, wherein each projection angle will have neighboring projection angles;

e) identifying the projection angle with the smallest number of intersections to find a future scan angle that gives the clearest unobstructed view of the largest number of discrete features;

f) finding the projection angle having the maximum angular distance from the nearest sampled neighboring projection angles; and g) combining the results of the future scan angle identified in step 1) and the projection angle identified in step f) to calculate a score for each candidate scan angle whereby the angle with the highest score is selected to be the next scan angle.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity of illustration.

DETAILED DESCRIPTION OF THE INVENTION

The present invention relates generally to computed tomography (CT) imaging and, more particularly, to methods for limited-angle sparse computed tomography reconstruction.

CT Imaging (Theory)

CT is performed with a translatable x-ray source opposite an array of detectors (or sensors). A beam of x-rays is projected on the subject, and the x-rays travel through the subject or object to the detector array (see FIG. 1A). Changes in density and transmissibility throughout the internal structure of the subject result in varying levels of x-ray attenuation which results in location varying x-ray intensities striking the detectors. Therefore, the projection signal received by each row of detectors can be plotted vs. detector location. Projection measurements can be made at numerous angles around the circumference of the subject. The projection data for each row of detectors can be stacked consecutively with respect to relative scan angle to form a sinogram image (FIG. 1B) which represents the x-ray intensity for a feature at any radial location across a wide number of projection angles. The inverse radon transform may then be applied to reconstruct the image based on the available sinogram image data.

Figure 6A:
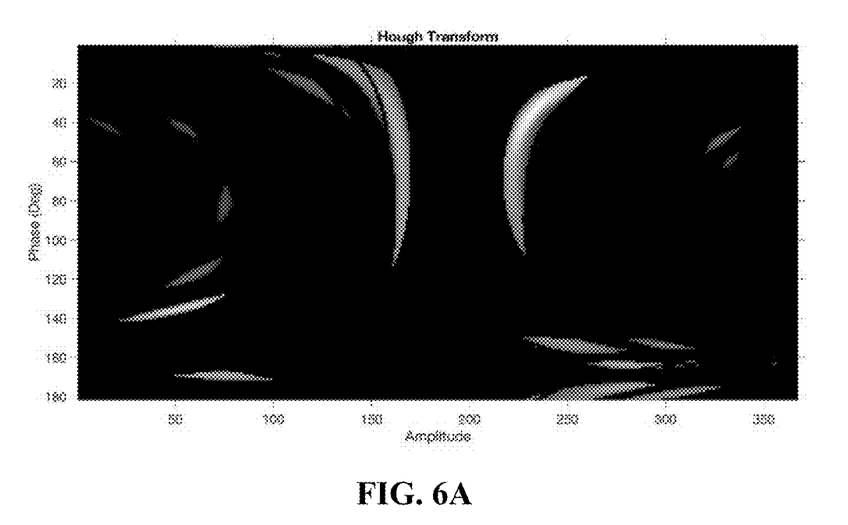
FIG. 6A is a Hough transform of initial sinographic data taken at angles ranging from 0 to 30 degrees.
Figure 6B:
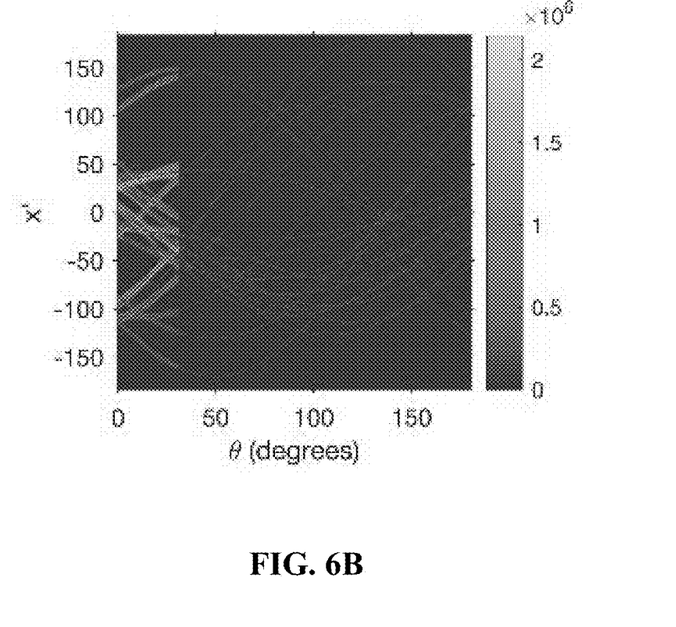
FIG. 6B is a depiction of centroidal sinusoids extrapolated from initial sinographic data as obtained from the Hough transform.
Figure 6C:
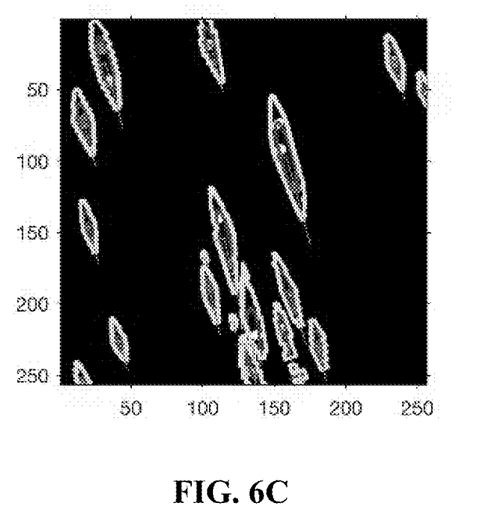
FIG. 6C is a depiction of the reconstructed features which are obtained from Hough Space and converted to reconstruction space as yellow outlines.

A feature portrayed in a sinogram image follows a sinusoidal path due to projections being taken across many angles. This sinusoidal behavior indicates that a full 360 degree span of projection images is unnecessary to fully reconstruct an image because sinusoidal behavior is equal and opposite beyond 180 degrees. Therefore, reducing the required scan angle to a range of 0 to 179 degrees can result in a full reconstruction of the subject. For other limited-angle situations (e.g., 0-30 degrees, 0-50 degrees, etc.), however, partial reconstruction may still be achieved, however image skew artifacts will be present for angles that are sub-sampled. The terms "skew" and "skewed", as used herein, refers to features that are elongated and/or smeared. For example, FIG. 6B is sinogram representing only 30 degree angle scan range and estimated sinusoidal paths (shown in red lines). FIG. 6C shows the resulting reconstruction of the scan shown in FIG. 6B showing heavy skew and artifacts.

Figure 3A:
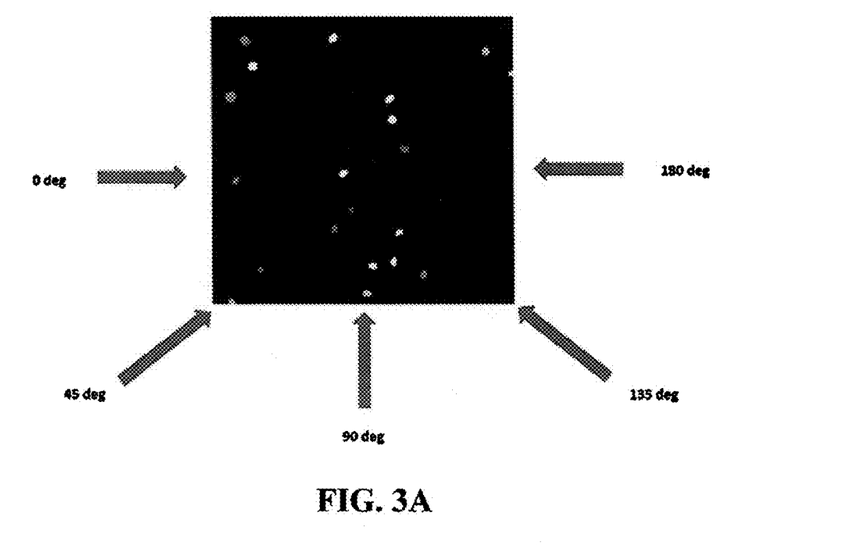
FIG. 3A is a graphic showing several scan angles at which data may be taken.
Figure 3B:
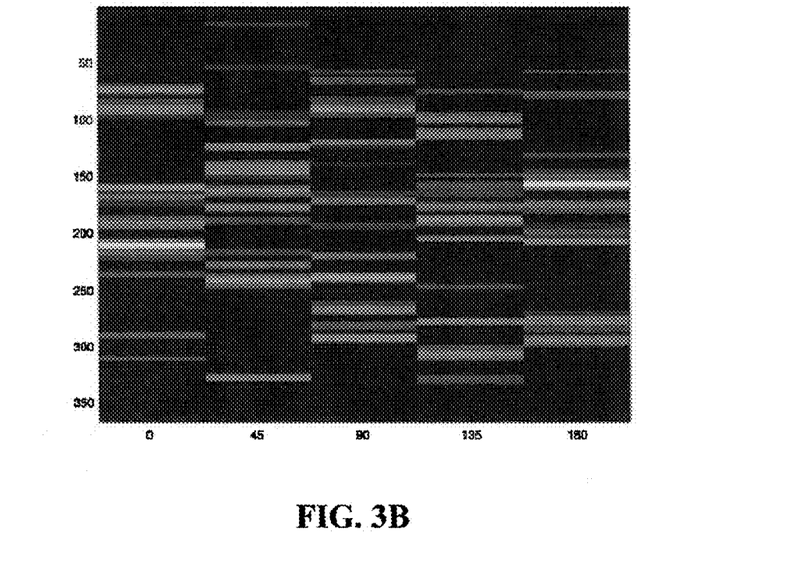
FIG. 3B shows the sinograph resulting from the scan angles in FIG. 3A. Any angles for which data is not taken is excluded from the sinographic image.
Figure 4:
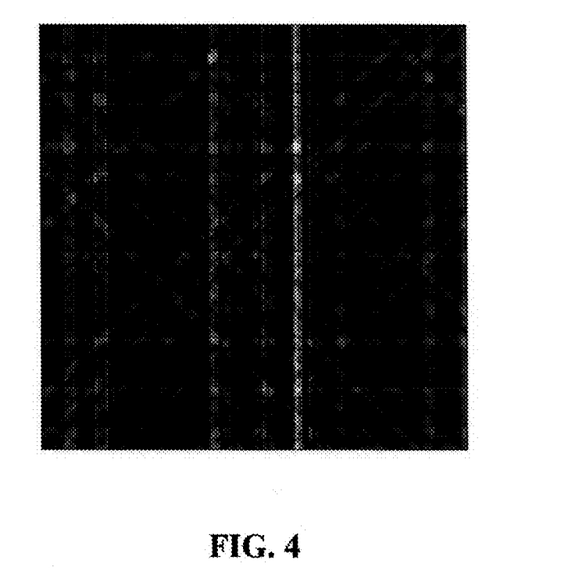
FIG. 4 is the reconstructed image for a sparse angle scan of four equally spaced angles around the circumference of the phantom slice.
Figure 5:
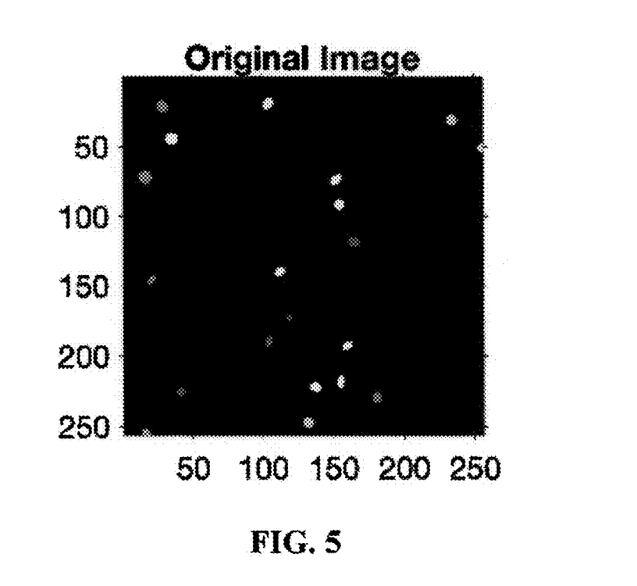
FIG. 5 is the two-dimensional article shown in FIGS. 1 and 3A that is scanned.

For sparse computed tomography, small numbers of projections are obtained at discrete angles, for example, as shown in FIG. 3A. FIG. 3B shows that this approach results in a sparse sinogram with significant amounts of missing (zero) data. Projections may be reconstructed from this data through various methods including the traditional filtered back projection. However, large artifacts will exist in the resulting reconstruction. FIG. 3A shows a phantom slice consisting of twenty small elliptical features. Suppose, as shown in FIG. 3A, that projections are obtained from this phantom every 45 degrees across a span of 0-180 degrees. The resulting sinogram would consist of four distinct angles (0 degrees and 180 degrees are effectively the same angle) containing projection data and 176 angles with no data. The resulting image reconstruction would be as shown in FIG. 4, and it does not allow the viewer to distinguish all the features and their respective characteristics easily. Improving the reconstructed representation of the object requires additional data (i.e., filling in the missing portions of the sinogram image).

Present Method

The present method is used for reconstructing a three-dimensional result image data set from a plurality of two-dimensional tomographic images that create a three-dimensional representation of an object (or a region of interest within an object) and its corresponding internal features.

The term "object", as used herein, can be any living or deceased organism (including, but not limited to a human or animal body, or portion thereof), or it can include an inanimate object such as a piece of equipment or an article or a product made by a manufacturing process. Thus, the term "object" can include anything that has been, or can be subject to a CT scanning process. The term "object", as used herein, includes both the overall object and a region of interest within the object, unless otherwise indicated.

The method comprises an initial step of obtaining a sinogram image of the object from a limited number n of scan angles around the object. The sinogram portrays sinusoidal paths that represent the radial locations and observed widths of features in the object throughout the rotation. CT scans are typically taken from thousands of scan angles. The limited number n of scan angles around the object can, for example, range from 100 or fewer scan angles up to 1,000, 2,000, or more scan angles. Each vertical line of pixels in the sinogram represents the projection of a slice of the object at a given rotation angle relative to the x-ray source, and each individual pixel intensity is directly related to the voltage output of the detector sensor array. Since reducing the required scan angle to a range of 0 to 179 degrees will result in a full reconstruction of the subject, the sinogram image of the object may be obtained from a limited number n of scan angles in a scan angle rotational range of from 0 degrees to 179 degrees around the object. The sinusoidal paths have an amplitude and a phase shift.

For discrete features in an object, the projected locations and widths of every feature may often be measured for each collected scan angle. The resulting sinogram portrays sinusoidal paths that represent the radial locations and observed widths of the features throughout the rotation. Since these paths are sinusoidal, their behavior is predictable and can be leveraged to predict sinogram behavior at unsampled projection angles. To this end, a sine wave-based Hough transform is defined to identify sinusoidal features in the sinogram image. A Hough transform is a feature extraction technique used in image analysis, computer vision, and digital image processing.

To perform the Hough transform, a series of amplitudes ($A_i$) ranging from 0 to $A_{mx}$ are defined, where $A_{mx}$ is the maximum sinogram image radial pixel location. In addition, a series of phase shift values ($\delta_j$) ranging from e.g., 0 to 179 degrees are defined and spatially sampled at a frequency appropriate for desired scan angle resolution. The spatial frequency can, for example, range from as low as every 0.01 degrees, or less, up to every integer number of degrees, or every multiple integer numbers of degrees (e.g., every 2, 3, 4, 5, etc. number of degrees) up to e.g., 179 degrees. Additionally, a zero matrix (dimensions $A_{mx} \times n$) where n is the number of angles represented in the sinogram image is initiated. For each combination of amplitude and phase shift, a sine wave of the form $$y = A_i * \sin(\theta + \delta_j) \quad 1)$$

is superimposed over the sinogram image.

Phase shift is related to the radial location of the feature at the initial (0 degree) scan angle and how that radial location in subsequent projections changes. A feature that is located at 0 radius for the initial scan angle and increases radial location as the scan angle progresses would have a phase shift of zero, while any feature that begins at a non-zero radial location would be represented by a phase shifted sine wave.

The sum of all overlaid sinographic pixel intensities is calculated for each overlaid sine wave, and the resulting summation is assigned to the matrix position (i, j). The resulting Hough Space represents combinations of amplitude and phase shift which form sinusoidal waveforms. Each Hough peak maximum corresponds to the centroid of a perceived object feature. The centroid of each feature is represented in sinographic space as a characteristic sine-based waveform that represents the amplitude and phase shift of the full sinographic waveform. If a threshold is applied to the Hough space to remove noise and filter out low responding content, Hough peaks may easily be identified. Each peak in the Hough space can be segmented using image processing methods, and bounding curves for each peak can be defined. The bounding curves of each segmented peak and the maximum location of each peak may be transformed into reconstruction space that relates back to the original subject by a polar coordinate relation such that $$x = A_i * \sin(\delta_j) \quad 2)$$

and $$y = -A_i * \cos(\delta_j) \quad 3)$$

The result is an outlined representation of each identified feature and its centroid in a reconstructed image.

Selecting Subsequent Projection Angles

While traditional CT scans are comprised of thousands of projections that are combined to reconstruct the original subject, angle access limitations, time, and cost often are prohibitive. Therefore, a method has been developed using the above reconstruction technique to sample from a narrow range of projection angles to estimate feature sinogram paths. Once the features have been identified and sine waveforms have been defined from the Hough Space, an informative projection angle or series of projection angles that will best inform future reconstructions may be identified using a combination of three criteria: sinusoidal intersections, sampling distance, and reconstruction elongation. Each of these criteria address common issues in reconstruction such as obstructed features, aliasing artifacts, and skewing artifacts.

Sinographic data represents the radial location of a given feature at a range of projection angles. If two or more features occupy the same radial location at a given projection angle, a sinusoidal intersection is observed in the sinographic image. Therefore, to maximize the information obtained for the largest number of features, a projection angle with very few sinographic intersection points should be prioritized. Once the original subject has been scanned, and the centroids of each discrete feature identified, the centroidal sine wave of each feature may be compared to each of the other sine wave representations in the sinogram image, and angles of intersection may be identified. The "angles of intersection" refers to the fact that the intersection only occurs at certain discrete scan angles. At each projection angle represented by the sinogram, the total number of intersections should be counted. The projection angle with the smallest number of intersections represents the projection that gives the clearest unobstructed view of the largest number of distinct features.

For situations where very few projection angles are used in a reconstruction, the reconstruction will often contain erroneous features which is due to aliasing—the number of data points is too small to distinguish between a large number of features in sinographic space. Therefore, more data is needed to clearly delineate between one artifact and another. One way to strategically identify projection angles that will reduce the effects of aliasing is to maximize the relative distance between previously sampled projection angles and the next projection angle. The distance between two angles is rather straightforward to calculate as long as angle wrapping is accounted for—that is that the distance between 0 degrees and 180 degrees is 0 degrees because a projection at 0 degrees provides the same information as a projection at 180 degrees. Therefore the distance ($\psi_i$) between two angles is given by the piecewise equation $$\psi_i = f(x) = \begin{cases} |\theta_j - \theta_i|, & |\theta_j - \theta_i| \le 90 \\ 180 - |\theta_j - \theta_i|, & |\theta_j - \theta_i| > 90 \end{cases} \quad 4)$$

Therefore, for each candidate angle, the distance to its nearest sampled neighbor should be calculated and the angle which is the furthest distance from a sampled neighbor should be prioritized for the next projection.

In cases where projections are biased toward a single angular region, it is common for elongated or smeared features to be present in the reconstruction. The principal directions of each smear or elongated feature may be calculated using the covariance matrix of the feature in reconstructed space. Once a feature boundary is determined from the footprint of a Hough peak and converted to reconstruction space, the pixel locations within the feature boundary should be collected in a nx2 matrix where column 1 represents the x coordinates and column 2 represents the y coordinates. The covariance matrix (C) may be calculated as $$C = \begin{bmatrix} \text{cov}(X_1, X_1) & \text{cov}(X_1, X_2) \\ \text{cov}(X_2, X_1) & \text{cov}(X_2, X_2) \end{bmatrix} \text{ where} \quad 5)$$

$$\text{cov}(X_i, X_j) = \frac{1}{N-1} \sum_{k=1}^{N} (X_{i,k} - \mu_{X_i})(X_{j,k} - \mu_{X_j}) \quad 6)$$

and the principal directions of the skewed feature may be determined by calculating the eigen vectors of the covariance matrix. The eigen vector related to the smallest eigen value is the direction of the skew, and the eigen vector related to the largest eigen value is orthogonal to the skew direction. Therefore, the angle that minimizes skew should be found approximately orthogonal to the average skew direction of all the discrete features. This direction may be obtained by collecting the non-skew eigen vector for every feature of interest and calculating the collective mean of each vector component. The resulting vector (v) may be converted to a projection angle which may be sampled next to inform the reconstruction and remove skew using:

$$\theta = \tan^{-1}\frac{v_j}{v_i} \qquad 7)$$

The resulting angle will be between 0 and 90 degrees and should be converted to the equivalent angle between 90 and 180 degrees if vi is less than 0. The method is used for at least partially reducing skew. The phrase "at least partially reducing skew" includes reducing the skew by any amount, as well as completely removing skew. If the correct angles and angle sampling width are chosen, the skew can be removed, but there may be some situations where skew is only reduced in an iteration.

Three metrics have been developed using the proposed method of reconstructing discrete features via CT: 1) minimum intersection angle, 2) maximum angular distance, and 3) skew direction. Each of these metrics may be used to develop a method for strategically identifying highly informative projection angles to optimize CT sparsity and minimize time and cost of CT measurements. Below is a proposed workflow to this end.

Example

The following example illustrates particular properties and advantages of some of the embodiments of the present invention. Furthermore, this example of reduction to practice of the present invention and confirmation that the principles described in the present invention are therefore valid but should not be construed as in any way limiting the scope of the invention.

Targeted Sparse CT Workflow

Consider the phantom image in FIG. 3A that contains 20 features of differing image intensity values. A reconstruction using targeted sparse CT techniques can be constructed using the workflow described below.

Figure 1A:
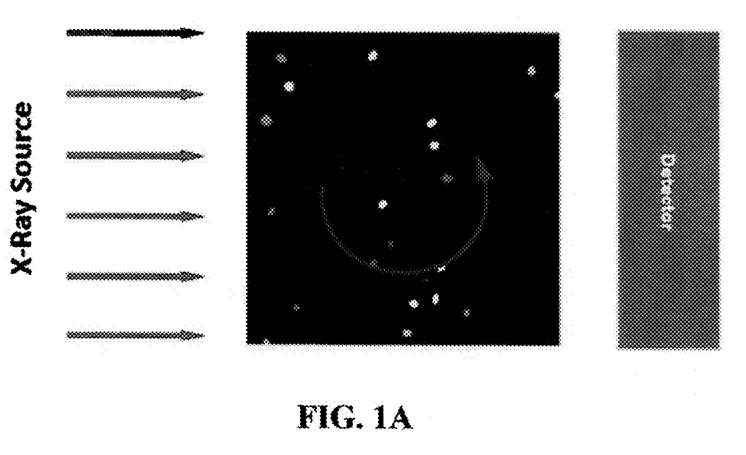
FIG. 1A is a diagram showing the basics of a computed tomographic projection system where an X-ray source passes through one example of a two-dimensional article in the nature of a phantom slice containing elliptical features to a detector on the other side to create a projection signal.
Figure 1B:
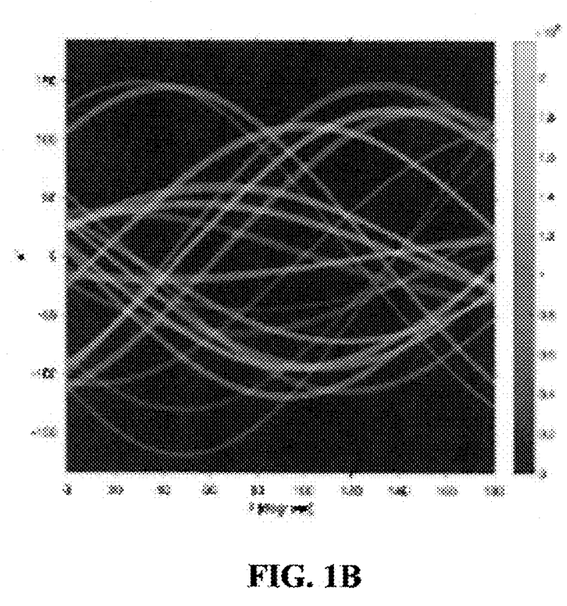
FIG. 1B is a diagram showing the resulting projections as the article rotates relative to the direction of the X-ray source that are collected into an image known as a sinogram.
Figure 2A:
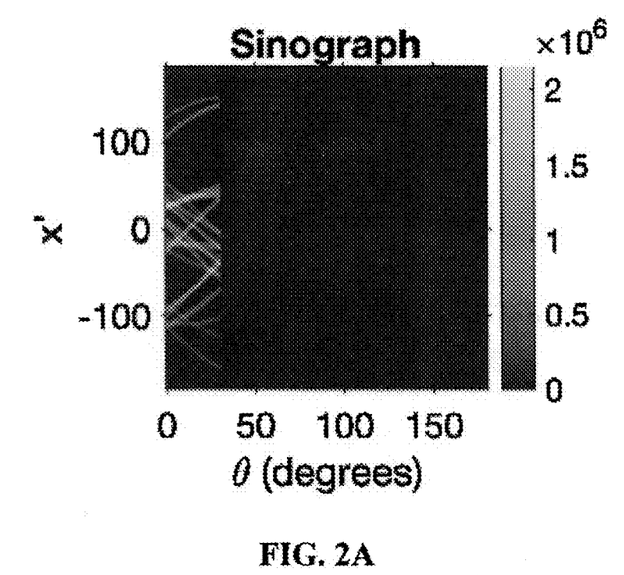
FIG. 2A is a sinogram representing only a 30 degree angle scan range.
Figure 2B:
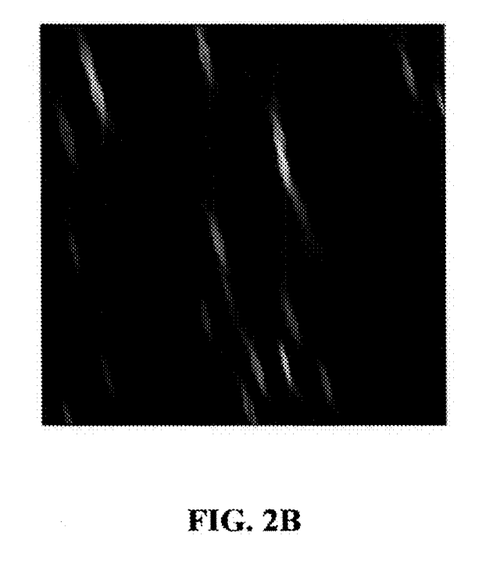
FIG. 2B shows the resulting back-projection reconstruction of the scan shown in FIG. 2A showing heavy skew and artifacts.

1. A swath of high density tomographic images are obtained across a limited angle range. For example, images are densely sampled from 0-30 degrees to obtain an initial understanding of number of features, approximate location in the object and an initial understanding of the sinographic path that the features follow throughout the initial rotation. The original image is shown in FIG. 1A and the resulting sinograph is shown in FIG. 2A. Each individual sinusoidal segment in the sinograph represents a single feature in the original image.

2. Hough Transformation of sinographic data is performed, and data thresholding is applied. FIG. 6A is a Hough transform of initial sinographic data taken at angles ranging from 0 to 30 degrees. The resulting Hough peaks are segmented and bounded using image processing techniques. FIG. 6B shows a depiction of centroidal sinusoids extrapolated from initial sinographic data as obtained from the Hough transform. Peak maxima are also identified as the centroidal location of each feature. FIG. 6C shows that each peak is translated to reconstruction space and the principal directions of each feature are calculated via the eigen vectors of the corresponding covariance matrices. The principal directions of each reconstructed feature are determined by an approximate 2-d probability distribution function shown as a red outline within the yellow reconstruction. The reconstruction is overlaid on the original image.

Figure 7:
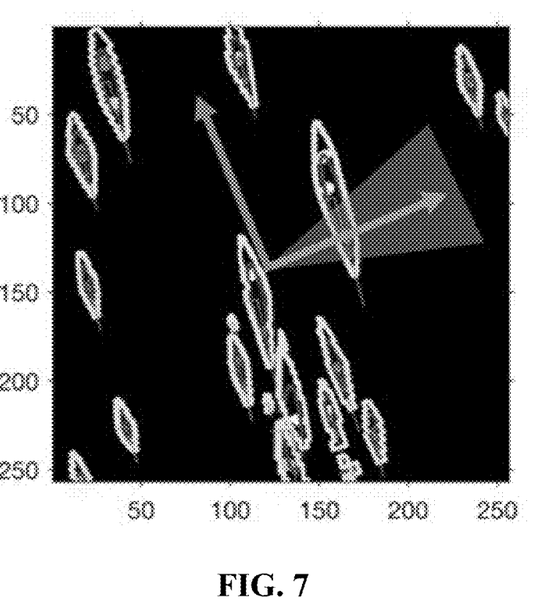
FIG. 7 is a reconstructed image with the average skew direction (blue arrow) and the proposed "next angle direction" (orange arrow) annotated. The translucent orange triangle represents the range of scan angles to obtain in the targeted scan.

3. The next projection angle may be selected based on the average directions of all the minor axes of each skewed feature. By converting the average vector to an angle via trigonometric relationships, the data taken at this angle will significantly increase the accuracy of the reconstruction. In FIG. 7, the average skew direction for all the image features is represented by the blue arrow. The direction perpendicular to this skew angle is represented by the orange arrow and indicates the scan angle that will most improve the reconstructed image relative to the ground truth.

Figure 8A:
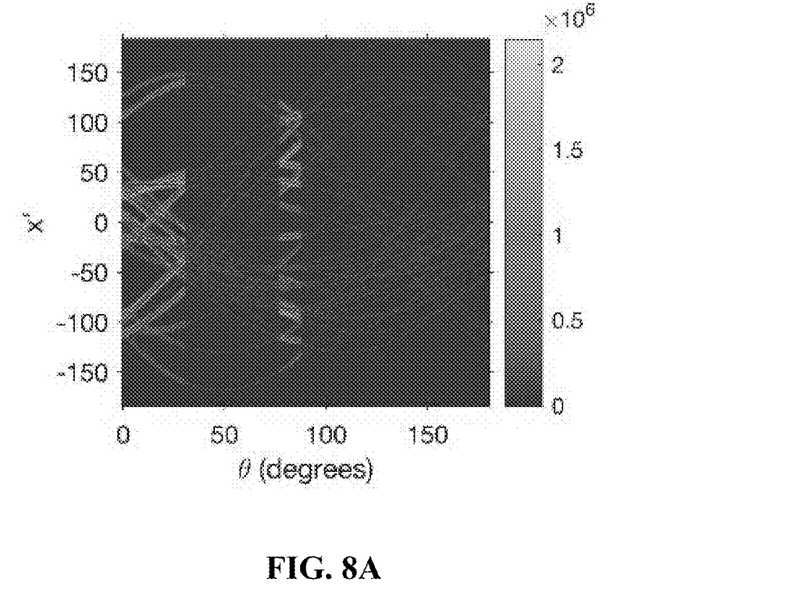
FIG. 8A is a sinograph showing a combination of preliminary sinographic data and the primary angle selected for skew removal.
Figure 8B:
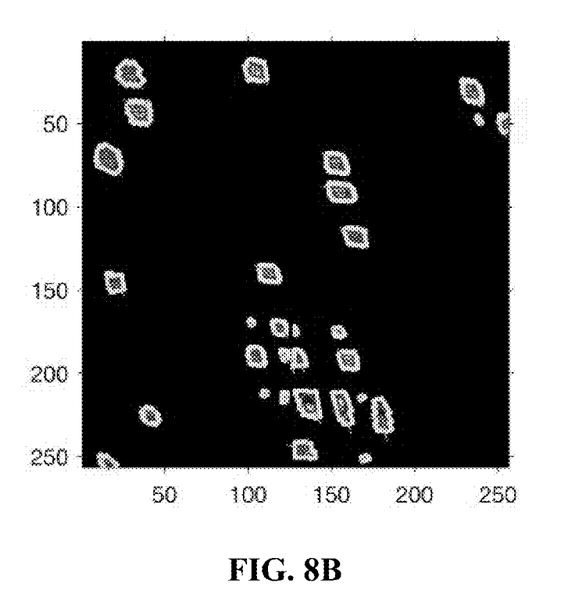
FIG. 8B is a reconstruction after one iteration of the targeted sparse CT scanning which is represented sinographically in FIG. 8A.

4. Obtain a narrow swath of projections from the angles surrounding the calculated "next direction" as demonstrated by FIG. 7 and repeat step 2 with the appended projection dataset. The sinograph obtained from the original scan and the subsequent scan is shown in FIG. 8A. As can be observed in FIG. 8B, after one iteration, several features have been identified, however, as can be seen in close examination of the sinogram image (FIG. 8A), several sinusoidal paths have been predicted that do not match exactly the sinographic data. These aliased features appear as "false" features in the reconstruction.

5. Steps 3 and 4 may be repeated several more times if significant skew is still observed in the data; however, after one or two iterations, the value to effort ratio often decreases significantly. As is observed in FIG. 8B, the significant skew has been removed from the reconstructed image, and the algorithm may proceed to step 6. Additionally, if the recommended angle from step 4 has already been sampled or if the reconstruction does not change significantly, proceed to step 6.

Figure 9:
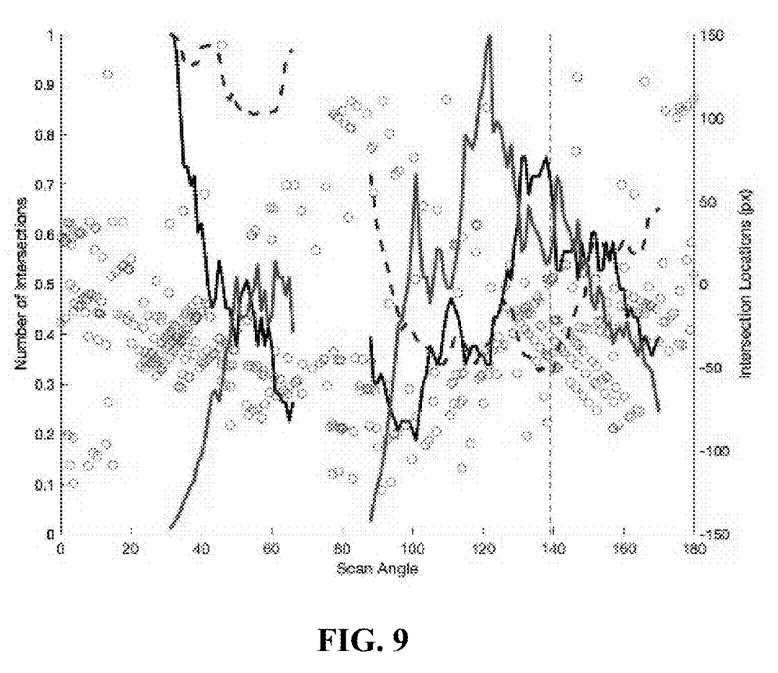
FIG. 9 is a graphic showing the intersection angles and the radial locations (blue circles) as well as the normalized number of intersections (black), the normalized score (red), the actual error compared to the original image (blue-dashed), and the location of minimum error (vertical dashed).

6. Identify unsampled projection angles and evaluate each angle for predicted number of sinographic intersections and distance from nearest neighbor. A calculated score ($z_k$) that accounts for both number of intersections and distance from the nearest angle may be defined such that $$z_k = \frac{\psi_k}{x_k}$$

where $\psi_k$ is the distance of a scan angle to its nearest, previously-sampled neighbor and $x_k$ is the number of centroidal intersections observed in the sinographic image at the angle (k). Note that $x_k$ should be averaged over a span of angles (presumably, the span of the next targeted scan angle swath) to ensure that the data is continuous. Representative data obtained at the conclusion of step 4 above is shown in FIG. 9. FIG. 9 is a graphic showing intersection locations (small blue circles) as well as the normalized number of intersections (black), normalized score (red), actual error compared to the original image (blue-dashed), and location of minimum error (vertical dashed). Blank sections of lines indicate angle regions that have already been fully or partially sampled.

As can be observed in FIG. 9, the location of minimum error is located approximately at 140 degrees, but the maximum score location is located at 120 degrees. The reconstruction error observed at the maximum score location is comparable to the minimum error. Therefore, the angle obtained through the use of the scoring method gives a sufficient "next guess" for a future scan angle. Step 6 may be performed repeatedly until a sufficient enough reconstruction is completed or until there are no feasible scan angles remaining.

The algorithm described above relies on a score that is independent of the original image and determined based on the sparse tomographic data that has been collected previously. With this in mind, it is important to characterize the actual performance of the algorithm for a known dataset compared to choosing the optimal next scan angle every time.

Figure 10:
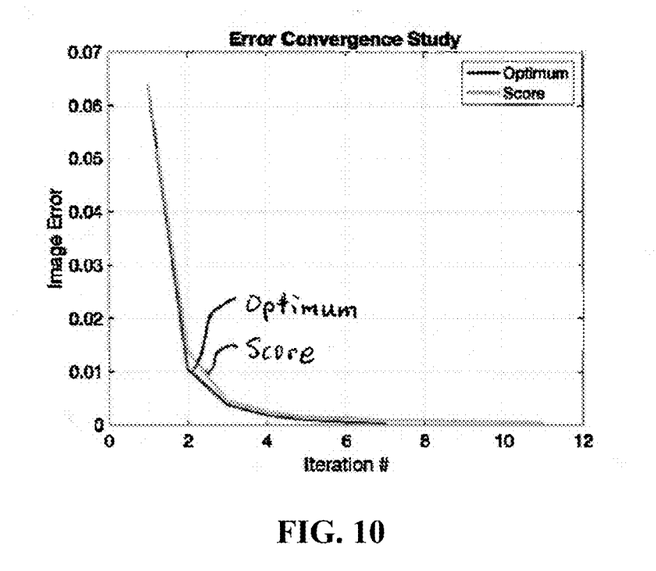
FIG. 10 is a graph depicting the algorithm error convergence study. The blue line represents choosing the optimum angle based on minimum error for each subsequent angle. The yellow line represents choosing the best predicted angle based on the scoring system developed herein.

As FIG. 10 depicts, with an ending error criteria of 5e-3 (0.005), the scoring method takes four more iterations than the optimum angle approach. In general, however, the scoring method follows the trend of the optimum method very closely and only diverges from the optimum method at the scale of very small details. At the seventh iteration (the terminal iteration of the optimum angle approach), the error difference between the two methods for a 256×256 pixel image is equivalent to a misidentification of 340 pixels out of 65,536 total pixels which is acceptable for approximating individual defect size and location.

It is also important to determine whether the algorithm consistently chooses the best angle to minimize the error between the reconstruction and the original image. In order to measure the capability of the algorithm, a study is performed with initial scan data provided to the algorithm from 0 to 30 degrees. Each angle from 31 degrees to 170 degrees is evaluated and a reconstruction is performed at each angle. The reconstructed image is compared to a full reconstruction (0-180 degrees), and the error between the partial reconstruction and the full reconstruction is calculated. Then, the angle that showed the minimum error compared to the full reconstruction is chosen as the optimal angle. Subsequently, each angle was scored based on the algorithm described above. A predicted best angle is selected based on the angle with the highest score, and compared to the optimal angle. The study continues by collecting additional data at the angle selected based on the best score, and the process is repeated. Once the scoring algorithm is completed and a minimum error is obtained, the optimal angles are compared with the angles that produce the best scores and are visualized in FIGS. 11A-C.

Figure 11A:
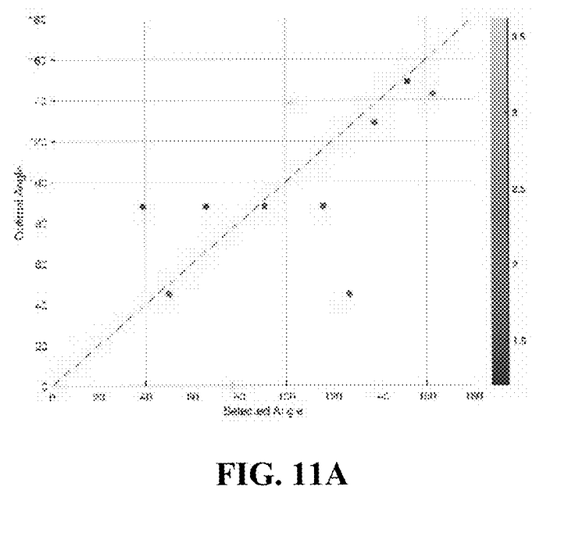
FIG. 11A is a graphical comparison of the optimal scan angles and the angles with the best prediction scores. In this figure, the marker color indicates the score of the selected angle.
Figure 11B:
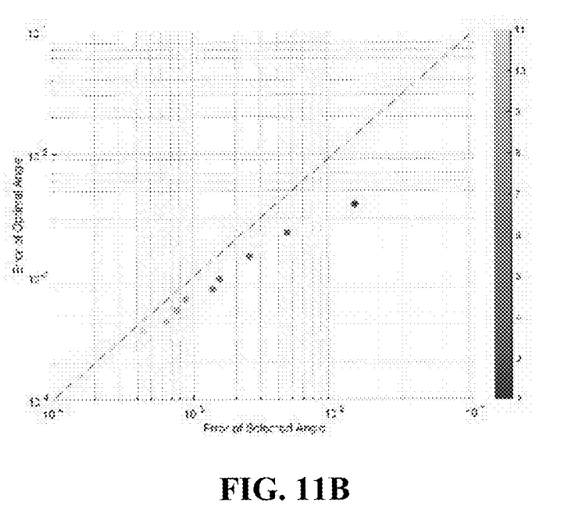
FIG. 11B is a graphical comparison of error for the optimal angle and the error of the score-based selected angle. In this figure, the marker color indicates the iteration number.
Figure 11C:
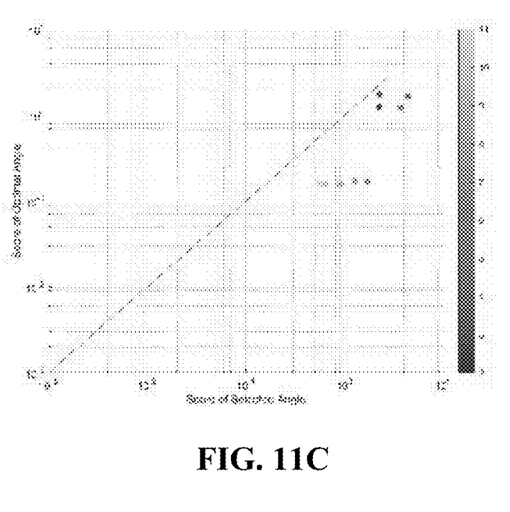
FIG. 11C is a graphical comparison of the score for the optimal angles and the score-based selected angles. In this figure, the marker color indicates the iteration number.

FIG. 11A shows that in general, the scoring method chooses an angle that is somewhat close to the optimal angle, but this is not consistent. What FIG. 11B shows, however, is that the angle selected based on the score produces an error that is comparable to the optimum error. This also corroborates the previous investigation on convergence rate. FIG. 11C shows that the score of the selected angle is consistently higher than the score of the optimal angle which indicates that it is not a perfect predictor of the optimal angle. However, all of the scores that were selected are grouped consistently together on the higher end of the score spectrum which indicates that the difference in scores between the selected angles and the optimal angles is very low (i.e., the score of the selected angle is very close to the score of the optimal angle).

As used herein, an element or step recited in the singular and preceded with the word "a" or "an" should be understood as including the plural of such elements or steps, unless the plural of such elements or steps is specifically excluded.

The methods described herein can provide a number of advantages. It should be understood, however, that these advantages need not be required unless they are set forth in the appended claims.

The methods provide for limited-angle sparse computed tomography reconstruction and next scan angle prediction for identification and characterization of stochastic, internal geometric features. This approach has critical implications for enhancing the capability of non-destructive evaluation technologies where limited radiation exposure, physical accessibility, and time/cost constraints are critical. The method was tested on a sample dataset, and several performance metrics were observed that show that this method consistently reduces the error between an iterative reconstruction at approximately the same rate as the total reconstruction.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method for reconstructing a three-dimensional result image data set from a plurality of two-dimensional tomographic images that create a three-dimensional representation of an object and its corresponding internal features, the method comprising the steps of:
    a) obtaining a sinogram image of the object from a limited number n of scan angles from a rotation around the object wherein X-rays were projected on the object and travel through the object to sensors at various locations, and the sinogram image portrays sinusoidal paths that represent the radial locations and observed widths of features in the object throughout the rotation, said sinusoidal paths having an amplitude and a phase shift;
    b) constructing a plurality of sine waves that represent sine wave amplitude and phase shift combinations at a spatial frequency represented in the sinogram image, wherein the sine waves intersect at sinographic pixel locations, said sinographic pixels having a pixel intensity value corresponding to an observed transmissibility of the object at the sensor location;
    c) superimposing the plurality of sine waves over the sinogram image; and
    d) calculating the sum of all intersecting pixel intensity values for each sine wave, and assigning the summation to a matrix position in order to create a Hough Space representation in which combinations of amplitude and phase shift resemble sine waves having a perceived sine wave path within the sinogram image, and each Hough peak maximum corresponds to the characteristic waveform of the sinusoidal paths in the sinogram image.

2. The method of claim 1 wherein the sinogram image of the object is obtained from a limited number n of scan angles in a scan angle rotational range of from 0 degrees to 179 degrees around the object.

3. The method of claim 1 wherein the scan that resulted in the sinogram image was taken from projection angles that are biased toward a single angular region such that the reconstruction contains skewed features, said method further comprising steps to identify projection angles that reduce the skewed features, comprising the steps of:
  e) calculating the principal directions of each skewed feature;
  f) determining the direction that is orthogonal to the average skew direction of all the discrete skewed features; and
  g) converting the direction to a projection angle to be sampled next in order to at least partially reduce the skew.

4. A method according to claim 3 for identifying and targeting scan projection angles of an object in a computed tomography process to maximize information that can be obtained in one or more future scans, the object having discrete features therein, the method comprising the steps of:
  h) obtaining a sinogram image and a Hough Space representation of an object, wherein said Hough Space representation represents a plurality of sine-like figures within the sinogram, and portrays them as peaks at locations corresponding to the centroidal radial location and rotational phase shift of the discrete feature;
  i) identifying the centroids of each discrete feature in the sinogram, said features each having a centroidal sine wave;
  j) comparing the centroidal sine wave of each feature to each of the other sine-like figures in the sinogram image, and identifying the angles of intersection;
  k) counting the total number of intersections at each projection angle represented by the sinogram, wherein each projection angle will have neighboring projection angles;
  l) Identifying the projection angle with the smallest number of intersections to find a future scan angle that gives the clearest unobstructed view of the largest number of discrete features;
  m) finding the projection angle having the maximum distance from the nearest sampled neighboring projection angles; and
  n) combining the results of the future scan angle identified in step l) and the projection angle identified in step m) to calculate a score for each candidate scan angle whereby the angle with the highest score is selected to be the next scan angle.

5. The method of claim 4 wherein the score $z_k$ is:

$$z_k = \frac{\psi_k}{x_k}$$

where $\psi_k$ is the distance of a scan angle to its nearest, previously-sampled neighbor and $x_k$ is the number of centroidal intersections observed in the sinographic image at the angle (k).

* * * * *